(12) United States Patent
Van Hoven

(10) Patent No.: US 8,171,881 B2
(45) Date of Patent: May 8, 2012

(54) MILKING FACILITY AND METHOD FOR MILKING THEREIN

(75) Inventor: Fernand Van Hoven, Gorssel (NL)

(73) Assignee: DeLaval Holding AB, Tumba (SE)

( * ) Notice: Subject to any disclaimer, the term of this patent is extended or adjusted under 35 U.S.C. 154(b) by 237 days.

(21) Appl. No.: 12/439,900

(22) PCT Filed: Aug. 30, 2007

(86) PCT No.: PCT/SE2007/000757
§ 371 (c)(1),
(2), (4) Date: May 29, 2009

(87) PCT Pub. No.: WO2008/030157
PCT Pub. Date: Mar. 13, 2008

(65) Prior Publication Data
US 2010/0192860 A1    Aug. 5, 2010

(30) Foreign Application Priority Data
Sep. 5, 2006   (NL) .................................... 0601819-6

(51) Int. Cl.
*A01J 5/00* (2006.01)
(52) U.S. Cl. .................................. 119/14.02; 119/14.03
(58) Field of Classification Search ............... 119/14.02, 119/14.03, 14.1, 14.08, 14.18, 51.02, 14.01, 119/520, 840, 842
See application file for complete search history.

(56) References Cited

U.S. PATENT DOCUMENTS

| | | | | |
|---|---|---|---|---|
| 4,419,961 A * | 12/1983 | Vandenberg et al. | ...... | 119/14.03 |
| 5,241,924 A * | 9/1993 | Lundin et al. | .............. | 119/51.02 |
| 5,704,311 A * | 1/1998 | Van den Berg | ............ | 119/14.02 |
| 5,959,526 A * | 9/1999 | Tucker | ....................... | 340/572.1 |
| 6,516,744 B1 * | 2/2003 | Bjork et al. | ................. | 119/14.02 |
| 6,520,112 B2 * | 2/2003 | Van der Lely et al. | ..... | 119/14.02 |
| 6,526,919 B1 * | 3/2003 | Schick | .......................... | 119/840 |
| 6,571,730 B1 * | 6/2003 | Norberg | ..................... | 119/14.03 |
| 7,296,536 B2 * | 11/2007 | Umegard | .................... | 119/14.03 |

(Continued)

FOREIGN PATENT DOCUMENTS

EP          0 566 201          10/1993

(Continued)

OTHER PUBLICATIONS

International Search Report dated Dec. 6, 2007, from corresponding PCT application.

*Primary Examiner* — Rob Swiatek
*Assistant Examiner* — Ebony Evans
(74) *Attorney, Agent, or Firm* — Young & Thompson

(57) ABSTRACT

A space-saving milking facility includes an entrance passage way (17a) provided for receiving milking animals on a voluntary basis, a waiting area (11), a milking area (13) housing automatic milking stations (31), a post-milking area (15), and an exit passage way (17b), through which milking animals may leave the milking facility. The automatic milking stations (31) are arranged side by side along a row, the waiting area (11) and the post-milking area (15) are elongated and parallel with the row of automatic milking stations (31), the entrance passage way (17a) is joined to the waiting area (11) at a short side thereof, and the exit passage way (17b) is joined to the post-milking area (15) at a short side thereof. The milking facility is particularly aimed for herds of milking animals at grazing.

22 Claims, 1 Drawing Sheet

U.S. PATENT DOCUMENTS

| | | | |
|---|---|---|---|
| 7,370,606 B2 * | 5/2008 | Van der Lely et al. | 119/51.02 |
| 2004/0261723 A1 * | 12/2004 | Birk | 119/14.02 |
| 2006/0249083 A1 * | 11/2006 | Johansson et al. | 119/14.03 |
| 2008/0017118 A1 * | 1/2008 | Wigholm et al. | 119/14.03 |

FOREIGN PATENT DOCUMENTS

| | | |
|---|---|---|
| EP | 0 608 943 | 8/1994 |
| WO | 03/000044 | 1/2003 |
| WO | 2004/068940 | 8/2004 |

* cited by examiner

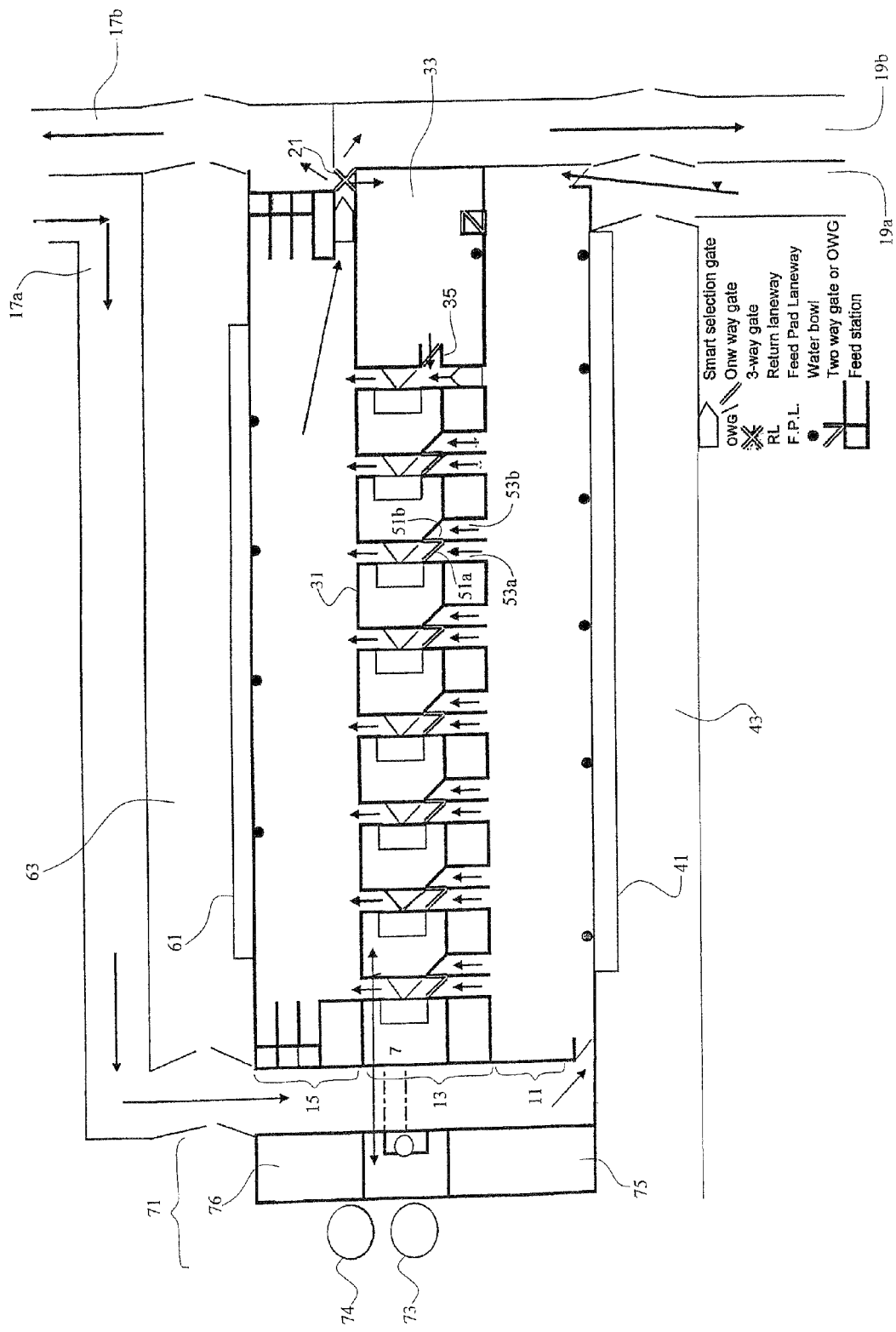

MILKING FACILITY AND METHOD FOR MILKING THEREIN

TECHNICAL FIELD OF THE INVENTION

The present invention relates generally to dairy farming, and more specifically the invention relates to a milking facility and to a method, respectively, for milking a large number of milking animals.

DESCRIPTION OF RELATED ART AND BACKGROUND OF THE INVENTION

A milking animal arrangement for housing large stocks of milking animals, e.g. hundreds or even thousands of milking animals, may comprise resting and feeding areas wherein the milking animals are allowed to rest and are fed, and a milking area housing a plurality of milking positions, at which the milking animals are milked.

Typically, very large stocks of milking animals are milked batch wise in for example parallel stall, Herringbone, or rotary milking systems at predetermined periods of times.

Voluntary milking systems for fully automated milking are well known in the art. They have typically been implemented for smaller herds of milking animals, i.e. up to 100 milking animals, in housed environments. However, when milking large stocks of milking animals automatically in voluntary milking systems some problems arise.

One problem encountered while implementing voluntary milking systems for large stocks of milking animals is the difficulties in obtaining high milking machine utilization. Another problem is that it is difficult to monitor and control a large number of milking animals and their movements.

These problems are particularly noticeable in very large farms wherein the milking animals are housed in different sections or pastures, and which have a large number of milking robots for milking.

Still another problem arises when a particular milking animal, which for example has to be treated manually by the farmer, shall be found. Even if the milking animals are housed in different sections it may be troublesome and time consuming to find the particular milking animal.

Further, the voluntary milking system may have drawbacks when being implemented in pasture-based systems. In New Zealand and Australia, for instance, the cows spend typically all their time on pasture. In such systems the cows may have to walk considerable distances to be milked and may have to be moved from one paddock to another, typically once a day, to efficiently utilize the grass that is grown. This puts obviously further demands on the arrangement used: it has to be capable of enticing and guiding the milking animals to walk the considerable distance to the milking system regularly and means has to be provided for directing the milking animals to appropriate paddocks after having been milked.

SUMMARY OF THE INVENTION

A general object of the present invention is thus to provide a milking facility for automatically milking a large number of milking animals, which solves or alleviates at least some of the above mentioned problems and shortcomings associated with the prior art.

In this respect there is a particular object of the invention to provide such a milking facility, which is capable of providing a cost-efficient milking production with high milking machine utilization and with high milk yields.

It is a further object of the invention to provide such a milking facility, which uses the available space efficiently in order to be capable of milking a large number of milking animals per unit area.

It is still a further object of the invention to provide such a milking facility, which is flexible, reliable, of fairly low cost, and easy to implement, and which is capable of maintaining a good overall control of the milking animals and their movements within the milking facility.

It is yet a further object of the invention to provide a method for milking a large number of milking animals, which can be implemented in a milking facility that fulfills any of the above mentioned objects.

These objects, among others, are according to the present invention attained by milking facilities and methods as specified in the appended patent claims.

According to a first aspect of the invention a milking facility is provided, which comprises a first entrance passage way, a waiting area, a milking area housing a plurality of automatic milking stations for milking the milking animals, a post-milking area, and a first exit passage way. The waiting area connects the first entrance passage way, which receives the milking animals on a voluntary basis e.g. from a pasture section, with the milking area. Each of the automatic milking stations comprises milking equipment, which is automatically attached to the teats of the milking animal present in the automatic milking station by a robot arm. The post-milking area connects the milking area with the first exit passage way, through which the milking animals may leave the milking facility on a voluntary basis e.g. in order to enter the same or another pasture section. The automatic milking stations are arranged side by side along a row, the waiting area and the post-milking area are elongated and parallel with the row of automatic milking stations, the first entrance passage way is connected to the waiting area at a short side thereof, and the first exit passage way is connected to the post-milking area at a short side thereof.

Hereby, a good overall control of the milking animals and their movements within the milking facility is achieved, wherein the distance the milking animals have to walk and the number of turns the milking animals have to perform are minimized to thereby provide an efficient milking production. The layout of the milking facility provides for an efficient use of available space.

In one embodiment of the invention a second entrance passage way is connected to the waiting area at a short side thereof, preferably opposite to the short side, at which the first entrance passage way is connected to the waiting area. Preferably, the first entrance passage way is connected to a first enclosed area, e.g. a first pasture section, and the second entrance passage way is connected to a second enclosed area, e.g. a second pasture section.

Additionally, or alternatively, a second exit passage way is connected to the post-milking area at a short side thereof, preferably the same short side, at which the first exit passage way is connected to the post-milking area. Preferably, the first exit passage way is connected to a first enclosed area, e.g. a first pasture section, and the second exit passage way is connected to a second enclosed area, e.g. a second pasture section.

A selection gate and a milking animal identification device may be provided in the post-milking area, wherein the milking animals in the post-milking area may be guided to enter a selected one of the first and second exit passage ways after having been identified.

By such provisions a plurality of separated groups of milking animals may be given access to the same milking area and after milking they are automatically separated again. The available space is very well utilized in a compact design, wherein the distance each milking animal has to walk to be milked is minimized.

In another embodiment of the invention a separation room is connected to the post-milking area, into which separation room selected milking animals are capable of entering by means of the provision of a selection gate and a milking animal identification device at the exit of the post-milking area. The separation room may comprise an exit gate leading back to the waiting area, to the post-milking area, or to an automatic milking station.

Hereby, ill milking animals or other milking animals that should be separated may be separated automatically after having been milked. The milking animals could be kept therein while awaiting the arrival of a farmer or veterinarian, which will examine or treat the milking animals. After this the milking animals may be released, preferably back to the waiting area or to the automatic milking station.

In yet another embodiment solid feed, particularly ensilage or roughage, is supplied to milking animals in the waiting area and/or in the post-milking area. To this end, a respective feed alley is arranged outside the waiting area and the post-milking area, respectively, in which feed alleys a feeding vehicle or other apparatus is capable of moving while supplying solid feed to the milking animals. Concentrate may be fed to the milking animals in the automatic milking stations.

Hereby, the milking animals can be fed appropriately. Particularly, in pasture-based systems the milking animals may be fed with too small amounts of roughage and ensilage. Therefore, feeding is advantageously performed both in the waiting area and in the post-milking area.

In still another embodiment of the invention, each of the automatic milking stations comprises two entries thereto, wherein each of the entries is preferably reached from a booth, which prevents a milking animal therein from being pushed away by a more dominant milking animal. Each of the automatic milking stations may comprise a device for opening either one of the two entries to the automatic milking station alternately, depending on waiting times of milking animals at the two entries, or depending on actions performed by milking animals at the two entries.

Hereby, less dominant milking animals can enter the automatic milking stations without being pushed away by other more dominant milking animals. The milking animals are less stressed and the milk production is increased.

In yet another embodiment a facility area is arranged at short sides of the waiting and post-milking areas, which are opposite to the short sides where the first entrance and exit passage ways are connected to the waiting and post-milking areas. The facility area may comprise a milk storage tank, a feed storage container, a machine room, and/or an office room.

Hereby, the available space is efficiently used. Access to the different areas from the facility area as well as feed and milk transportation are facilitated.

According to a second aspect of the invention a method is provided in a milking facility according to the first aspect of the invention, which comprises the steps of receiving milking animals on a voluntary basis through the first entrance passage way, allowing the milking animals to enter the elongated waiting area at a short side thereof, allowing milking animals in the waiting area to enter the milking area, milking the milking animals automatically in the automatic milking stations, allowing milking animals to leave the automatic milking stations and to enter the elongated post-milking area after having been milked, and allowing milking animals in the post-milking area to leave the post-milking area through the first exit passage way.

Another shortcoming of prior art is that milking animals, particularly milking animals on pasture, may receive to small amounts of concentrate, roughage, and ensilage.

Thus, in order to remedy such shortcoming, there is according to a third aspect of the invention provided a milking facility, which comprises an entrance passage way provided for receiving milking animals on a voluntary basis, a waiting area, into which milking animals are capable of entering from the passage way, and a milking area housing a plurality of automatic milking stations adapted to milk milking animals, into anyone of which automatic milking stations milking animals are capable of entering from the waiting area. Each of the automatic milking stations comprises milking equipment, which is automatically attached to the teats of a milking animal present in the automatic milking station by a robot arm. The milking facility further comprises a post-milking area, into which milking animals are capable of entering from the automatic milking stations, and an exit passage way, into which milking animals are capable of entering from the post-milking area, and through which milking animals may leave the milking facility. The automatic milking stations are arranged side by side along a row and each of the waiting area, the automatic milking stations, and the post-milking area comprises a feeding area provided for supplying solid feed to milking animals present therein.

Further characteristics of the invention and advantages thereof, will be evident from the following detailed description of embodiments of the present invention given hereinafter and the accompanying FIG. 1, which is given by way of illustration only and thus, is not limitative of the present invention.

BRIEF DESCRIPTION OF THE DRAWINGS

FIG. 1 illustrates schematically, in a top view, a milking facility for milking a large number of milking animals according to an embodiment of the present invention.

DETAILED DESCRIPTION OF EMBODIMENTS

A milking facility for automatically milking a large number of milking animals as being illustrated in FIG. 1 comprises a waiting area 11, a milking area 13 comprising a plurality of automatic milking stations 31, a post-milking area 15, a first entrance passage way 17*a*, and a first exit passage way 17*b*.

The milking facility is entirely automated, which means that milking animals enters the milking facility through the first entrance passage way 17*a* on a voluntary basis, they proceed to the waiting area 11 and enter each one of the automatic milking stations 31 for being milked. Each of the automatic milking stations 31 comprises milking equipment, which is automatically attached to the teats of a milking animal present in the automatic milking station by a robot arm. After having been milked the milking animals enter the post-milking area 15, and are leaving the milking facility on a voluntary basis by walking through the first exit passage way 17*b*.

The first entrance and exit passage ways 17*a*, 17*b* are preferably leading to a first pasture, in which the milking animals are walking about freely. Thus, the milking facility is primarily, but not exclusively, intended for grassland areas.

The automatic milking stations 31 are arranged side by side along a row, the waiting and post-milking areas 11, 15 are elongated and parallel with the row of automatic milking stations 31, the first entrance passage way 17a is connected to the waiting area 11 at a short side thereof and the first exit passage way 17b is connected to the post-milking area 15 at a short side thereof.

In the illustrated embodiment a second entrance passage way 19a leads to the waiting area 11 at a short side thereof, which is opposite to the short side, at which the first entrance passage way 17a is joined to the waiting area 11. The second entrance passage way 19a is preferably coming from a second pasture. Hereby, separate groups of milking animals that are grazing in different pastures may be given voluntary access to the milking facility.

Similarly, a second exit passage way 19b leads away from the post-milking area 15 at the same short side, at which the first exit passage way 17b is joined to the post-milking area 15. The second exit passage way 19a is preferably leading back to the second pasture. Hereby, separate groups of milking animals that are grazing in different pastures may, after having been milked in the milking facility, be guided voluntary back to their pastures.

By means of providing the entrance and exit passage ways 17a-b, 19a-b at the short sides of the milking facility, or more correctly, of the waiting and post-milking areas 11, 15, the available space is efficiently utilized and a good traffic flow of milking animals within the milking facility is encouraged.

In order to separate the milking animals appropriately, i.e. after having been mixed in the milking facility, a selection gate 21 and an associated milking animal identification device (not explicitly illustrated) are provided in the post-milking area 15, wherein the selection gate 21 is provided for allowing the milking animals in the post-milking area 15 to enter either one of the first and second exit passage ways 17b, 19b after having been identified by the milking animal identification device.

It shall be appreciated that in alternative embodiments there may be only one entrance passage way and/or only one exit passage ways, or there may be more than two entrance passage ways and/or more than two exit passage ways.

The milking area 13 is arranged at a first long side of the waiting area 11 and the waiting area 11 comprises a feeding area 41 along a second long side of the waiting area 11, which is opposite to the first long side, for supplying solid feed to milking animals in the waiting area 11, and for supplying water to milking animals in the waiting area 11. Preferably, a feed alley 43 is arranged outside, and along the second long side of, the waiting area 11. In the feed alley 43 a feeding vehicle or other apparatus is capable of moving while supplying solid feed, particularly roughage or ensilage, to the feeding area 41 of the waiting area 11.

The purposes of the waiting area 11 are thus to (i) provide a wide corridor area in which the milking animals may move, (ii) provide a waiting area for the milking animals (all milking animals cannot enter the automatic milking stations 31 immediately), (iii) provide drinking water to the milking animals, and (iv) provide solid feed to the milking animals.

Similarly, the milking area 13 is arranged at a first long side of the post-milking area 15 and the post-milking area 15 comprises a feeding area 61 along a second long side of the post-milking area 15, which is opposite to the first long side of the post-milking area 15, for supplying solid feed to milking animals in the post-milking area 15, and optionally for supplying water to milking animals in the post-milking area 15. Preferably, a feed alley 63 is arranged outside, and along the second long side of, the post-milking area 15. In the feed alley 63 a feeding vehicle or other apparatus is capable of moving while supplying solid feed, particularly roughage or ensilage, to the feeding area 61 of the post-milking area 15.

Further, the illustrated embodiment comprises a separation room 33 accessible from the post-milking area 15. The selection gate 21 and the associated milking animal identification device may be provided for allowing milking animals in the post-milking area 15 to enter the separation room 33 after having been identified by the milking animal identification device. The separation room 33 comprises preferably an exit gate 35 leading back to one of the automatic milking stations 31.

In other embodiments there may be an exit gate leading back to the waiting area 11 or to the post-milking area 15, or leading to a particular automatic milking station, similar to the automatic milking stations 31 but provided solely for milking the milking animals in the separation room 33.

The purposes of the post-milking area 15 are to (i) provide a wide corridor area in which the milking animals may move, (ii) provide drinking water to the milking animals, (iii) provide solid feed to the milking animals, and (iv) provide separation of milking animals (i.e. directing the milking animals to the separation room 33, to the first exit passage way 17b, or to the second exit passage way 19b).

The number of automatic milking stations 31 is adapted to the number of milking animals that should be milked by the milking facility (and to the frequency at which they are milked), and will in most applications be at least five. By the term "a large number of milking animals" as used in the present text is preferably meant a number of milking animals that is too high to be handled by a sole milking robot or automatic milking station. The DeLaval VMS, for instance, has a capacity of 50-70 milking animals.

The illustrated exemplary milking facility has eight automatic milking stations and is intended for herds of about 500 milking animals. The entire milking facility measures e.g. 47×24 m².

Each of the automatic milking stations 31 comprises two entries 51a-b thereto and each of the entries is reached from a respective booth 53a-b. The booth prevents a milking animal therein from being pushed away by a more dominant milking animal.

Each of the automatic milking stations 31 may comprise a device for opening either one of the two entries 51a-b to the automatic milking station alternately, depending on waiting times of milking animals at the two entries 51a-b, or depending on other parameters related to the milking animals at the two entries 51a-b, e.g. physical conditions of the milking animals. In another instance both the entries 51a-b may be openable at each instant, which means that if there are milking animals present in both booths 53a-b, the milking animal that is fastest or strongest will enter the automatic milking station 31 first.

Further, each of the automatic milking stations 31 may comprise a feeding device for feeding a milking animal therein with solid feed, preferably concentrate feed, as being conventional in the automatic milking stations of today.

A facility area 71 is arranged at short sides of the waiting and post-milking areas 11, 15, which are opposite to the short sides of the waiting and post-milking areas 11, 15, at which the second entrance and exit passage ways 19a-b are joined to the waiting and post-milking areas 11, 15. The facility area comprises typically a milk storage tank 73, a feed storage container 74, a machine room 75, and an office room 76.

It shall be appreciated that the various features of the present invention may be combined to reach still further embodiments and variants of the invention.

The invention claimed is:

1. A milking facility for milking a large number of milking animals comprising:
a milking animal waiting area (11);
a milking area (13) housing a first automatic milking station (31), said first automatic milking station (31) comprising i) milking equipment which is automatically attached to the teats of a milking animal present in the automatic milking station by a robot arm, and ii) an entrance admitting the one milking animal to said first automatic milking station (31);
a first booth (53a) with i) a first booth entrance connecting to said waiting area (11), and ii) a first entry (51a) located adjacent the entrance of said first automatic milking station (31), wherein a first animal enters the first booth from the waiting area via said first booth entrance and exits said first booth into said entrance of said first automatic milking area via said first entry (51a);
a second booth (53b) with i) a second booth entrance connecting to said waiting area (11), and ii) a second entry (51b) located adjacent the entrance of said first automatic milking station (31), wherein a second animal enters the second booth from the waiting area via said second booth entrance and exits said second booth into said entrance of said first automatic milking area via said second entry (51b);
said first and second booths providing respective first and second paths to said first automatic milking station (31), the first animal in the first booth and first path not being able to move into the second booth and into the second path, the second animal in the second booth and second path not being able to move into the first booth and into the first path, wherein each of said first and second entries respectively control entrance to the entrance of said first automatic milking station (31); and
a device connected to control said first and second entries (51a, 51b) rendering both of said first and second entries (51a, 51b) openable at the same instant wherein, when the first milking animal is a fastest or strongest of the first and second milking animal, the opening of the first and second entries at the same instant allows the first animal to open and move the first entry (51a) towards the second entry (51b) such that the second entry is blocked from opening by the first entry, when the second milking animal is the fastest or strongest of the first and second milking animals, the opening of the first and second entries at the same instant allows the second animal to open and move the second entry (51b) towards the first entry (51a) such that the first entry is blocked from opening by the second entry, whereby the fastest or strongest of the first and second milking animals will enter said one automatic milking station (31) via said entrance to said first automatic milking station with the other animal of the first and second milking animals being blocked from entering the milking station (31), and (31)
wherein an entirety of a space between the first and second entries and the entrance to said first automatic milking station (31) is sized to hold no more than one of the milking animals at a time.

2. The milking facility of claim 1,
wherein said milking area (13) comprises a plurality of said first automatic milking station, said first booth, and said second booth, said device connected to control each first entry and each second entry, and
the milking facility further comprising:
a first entrance passage way (17a) provided for receiving milking animals on a voluntary basis into said waiting area (11);
a post-milking area (15) located at an exit of each milking station (31) and into which milking animals are capable of entering from said automatic milking stations (31); and
a first exit passage way (17b) provided in said post-milking area (15), and through which milking animals may leave said milking facility, wherein,
said plurality of automatic milking stations (31) are arranged side by side along a row;
said waiting area (11) and said post-milking area (15) are elongated and parallel with said row of automatic milking stations (31);
said first entrance passage way (17a) is joined to said waiting area (11) at a short side thereof; and
said first exit passage way (17b) is joined to said post-milking area (15) at a short side thereof,
a second entrance passage way (19a) joined to said waiting area (11) at a short side thereof, opposite to the short side, at which said first entrance passage way (17a) is joined to said waiting area (11), said second entrance passage way (19a) being provided for receiving milking animals on a voluntary basis.

3. The milking facility of claim 2, wherein said first entrance passage way (17a) is joined to a first enclosed area, and said second entrance passage way (19a) is joined to a second enclosed area, which is separate from said first enclosed area.

4. The milking facility of claim 2, comprising a second exit passage way (19b) joined to said post-milking area (15) at a short side thereof, at which said first exit passage way (17b) is joined to said post-milking area (15), and into which second exit passage way (19b) milking animals are capable of entering from said post-milking area.

5. The milking facility of claim 4, wherein said first exit passage way (17b) is joined to a first enclosed area, and said second exit passage way (19b) is joined to a second enclosed area, which is separate from said first enclosed area.

6. The milking facility of claim 4 comprising a selection gate (21) and a milking animal identification device, wherein said selection gate (21) is provided for allowing milking animals in said post-milking area (15) to enter either one of the first and second exit passage ways after having been identified by said milking animal identification device.

7. The milking facility of claim 2, comprising a separation room (33) joined to said post-milking area (15), into which separation room milking animals are capable of entering from said post-milking area.

8. The milking facility of claim 7 comprising a selection gate (21) and a milking animal identification device, wherein said selection gate is provided for allowing milking animals in said post-milking area (15) to enter said separation room (33) after having been identified by said milking animal identification device.

9. The milking facility of claim 7 wherein said separation room (33) comprises an exit gate leading back to said waiting area (11) or to said post-milking area (15).

10. The milking facility of claim 7 wherein said separation room (33) comprises an exit gate (35) leading to an automatic milking station.

11. The milking facility of claim 2, wherein said row of milking areas (13) is arranged at a first long side of said waiting area (11), and said waiting area (11) comprises a feeding area (41) along a second long side of said waiting area (11), which is opposite to said first long side, for supplying solid feed to milking animals in the waiting area (11).

12. The milking facility of claim 2, wherein each of said plurality of automatic milking stations (31) comprises a feeding device for feeding a milking animal therein with solid feed.

13. The milking facility of claim 2, wherein the number of said plurality of automatic milking stations (31) is at least five.

14. The milking facility of claim 2, wherein said milking area (13) is arranged at a first long side of said post-milking area (15), and said post-milking area comprises a feeding area (61) along a second long side of the post-milking area, which is opposite to said first long side of the post-milking area, for supplying solid feed to milking animals in the post-milking area.

15. The milking facility of claim 14 wherein a feed alley (63) is arranged outside, and along the second long side of, said post-milking area, in which feed alley a feeding vehicle or other apparatus is capable of moving while supplying solid feed, particularly roughage, to the feeding area of the post-milking area.

16. The milking facility of claim 2, comprising a facility area (71) arranged at a short side of said post-milking area (15), which is opposite to the short side of said post-milking area, at which said first exit passage way is joined to said post-milking area, said facility area comprising any of a milk storage tank (73), a feed storage container (74), a machine room (75), and an office room (76).

17. A milking facility for milking a large number of milking animals comprising:
    a first entrance passage way (17a) provided for receiving milking animals on a voluntary basis;
    a waiting area (11) connected to said first entrance passage way (17a);
    a milking area (13) housing a plurality of automatic milking stations (31) adapted to milk milking animals, into anyone of which said automatic milking stations milking animals enter from said waiting area, each of said automatic milking stations comprising milking equipment which is automatically attached to the teats of a milking animal present in the automatic milking station by a robot arm;
    a post-milking area (15), into which milking animals enter from said automatic milking stations (31); and
    a first exit passage way (17b), into which milking animals enter from said post-milking area (15), and through which milking animals may leave said milking facility, characterized in that
    said plurality of automatic milking stations (31) are arranged side by side along a row;
    said waiting area (11) and said post-milking area (15) are elongated and parallel with said row of automatic milking stations (31);
    said first entrance passage way (17a) is joined to said waiting area (11) at a short side thereof; and
    said first exit passage way (17b) is joined to said post-milking area (15) at a short side thereof,
    wherein each of said plurality of automatic milking stations (31) comprises
    an entrance admitting exactly and only one milking animal into said automatic milking station (31);
    a first booth (53a) with i) a first booth entrance connecting to said waiting area (11), and ii) a first entry (51a) adjacent the entrance of said automatic milking station (31), a first animal entering the first booth from the waiting area via said first booth entrance and exiting said first booth to said entrance of said automatic milking area via said first entry (51a);
    a second booth (53b) with i) a second booth entrance connecting to said waiting area (11), and ii) a second entry (51b) adjacent the entrance of said automatic milking station (31), a second animal entering the second booth from the waiting area via said second booth entrance and exiting said second booth to said entrance of said automatic milking area via said second entry (51b);
    said first and second booths providing respective first and second paths to said automatic milking station (31), the first animal in the first booth and first path not being able to move into the second booth and into the second path, the second animal in the second booth and second path not being able to move into the first booth and into the first path, wherein each of said first and second entries respectively control entrance to the entrance of said automatic milking station (31),
    wherein said first and second entries (51a, 51b) are controlled to render both of said first and second entries (51a, 51b) openable at the same instant, wherein, when the first milking animal is a fastest or strongest of the first and second milking animal, the opening of the first and second entries at the same instant allows the first animal to open and move the first entry (51a) towards the second entry (51b) such that the second entry is blocked from opening by the first entry, when the second milking animal is the fastest or strongest of the first and second milking animals, the opening of the first and second entries at the same instant allows the second animal to open and move the second entry (51b) towards the first entry (51a) such that the first entry is blocked from opening by the second entry, whereby the fastest or strongest of the first and second milking animals will enter said automatic milking station (31) via said entrance to said first automatic milking station (31), with the other animal of the first and second milking animals being blocked from entering the milking station (31), and
    wherein an entirety of a space between the first and second entries and the entrance to said first automatic milking station (31) is sized to hold no more than one of the milking animals at a time.

18. The milking facility of claim 17, wherein each of said plurality of automatic milking stations (31) comprises a device for opening either one of the first and second entries to the automatic milking station alternately, depending on waiting times of milking animals at the two entries, or depending on physical conditions of milking animals at the two entries.

19. A method for milking animals in a milking facility comprising the steps of:
    receiving milking animals on a voluntary basis through a first entrance passage way (17a) and allowing the milking animals to enter an elongated waiting area (11) at a short side thereof from said first entrance passage way (17a);
    allowing milking animals in said waiting area (11) to enter a milking area (13) housing a plurality of automatic milking stations (31) in order to be milked in any of the automatic milking stations, the automatic milking stations being arranged side by side along a first long side of said elongated waiting area (11), and each of said automatic milking stations comprising i) milking equipment which is automatically attached to the teats of a milking animal present in each automatic milking station by a robot arm, ii) a first booth (53a) and a second booth (53b), said first and second booths providing respective first and second paths to a corresponding one of said automatic milking stations (31), iii) a first entry (51a) and a second entry (51b) associated with a respective one of said first and second booths (53a, 53b), said first entry (51a) and said second entry (51b) opening to a common entrance to said corresponding one automatic milking station (31), an entirety of a space between the first and second entries and the entrance to said one automatic milking station (31) is sized to hold no more than one of the milking animals at a time, said first entry (51a) being reached by a first milking animal in said first booth (53a) and said second entry (51b) being reached by a second milking animal in said second booth (53b), each of said first and second entries respectively controlling entrance to the common entrance of said one automatic milking station (31), and a device connected to control said first and second entries (51a, 51b) rendering both of said first and second entries (51a, 51b) openable at the same instant, whereby a fastest or strongest of the first and second milking animals will enter said one automatic milking station (31) via said common entrance;

automatically, using the device connected to control said first and second entries (51a, 51b), operating the first and second entries (51a, 51b) to render both of said first and second entries (51a, 51b) openable at the same instant, so that when the first milking animal is a fastest or strongest of the first and second milking animal, the opening of the first and second entries at the same instant allows the first animal to open and move the first entry (51a) towards the second entry (51b) such that the second entry is blocked from opening by the first entry, when the second milking animal is the fastest or strongest of the first and second milking animals, the opening of the first and second entries at the same instant allows the second animal to open and move the second entry (51b) towards the first entry (51a) such that the first entry is blocked from opening by the second entry, whereby the fastest or strongest of the first and second milking animals will enter said one automatic milking station (31) via said common entrance with the other animal of the first and second milking animals being blocked from entering the milking station (31);

allowing milking animals to leave the automatic milking stations (31) and enter an elongated post-milking area (15), a first long side of which being positioned along the automatic milking stations arranged side by side; and allowing milking animals in the post-milking area (15) to leave said post-milking area at a short side thereof through a first exit passage way (17b) to thereby leave the milking facility.

20. The method of claim 19 comprising the steps of:

receiving milking animals on a voluntary basis through a second entrance passage way (19a) and allowing milking animals to enter an elongated waiting area (11) at a short side thereof from said first entrance passage way (17a); and allowing milking animals in the post-milking area (15) to leave said post-milking area at a short side thereof through a second exit passage way (19b) to thereby leave the milking facility.

21. The method of claim 19 wherein the milking animals received on a voluntary basis through the first entrance passage way (17a) are received from a pasture; and the milking animals in the post-milking area (15) allowed to leave the milking facility through the first exit passage way (17b) are guided to a pasture.

22. The method of claim 19, wherein, solid feed is supplied to milking animals both in the waiting area (11) and in the post-milking area (15), the solid feed is supplied to the waiting area (11) by a feeding vehicle or other apparatus while moving outside said waiting area (11) along a feed alley (43) arranged along a second long side of said waiting area (11), which is opposite to said first long side of said waiting area (11); and the solid feed is supplied to the post-milking area (15) by a feeding vehicle or other apparatus while moving outside said post-milking area along a feed alley (63) arranged along a second long side of said post-milking area, which is opposite to said first long side of said post-milking area.

* * * * *